US007004550B2

(12) United States Patent
Root et al.

(10) Patent No.: US 7,004,550 B2
(45) Date of Patent: Feb. 28, 2006

(54) INTEGRATED TRAIN ELECTRICAL AND PNEUMATIC BRAKES

(75) Inventors: Kevin B. Root, Black River, NY (US); Bryan M. McLaughlin, Watertown, NY (US); Dale R. Stevens, Adams Center, NY (US); Jon M. Marra, Henderson, NY (US); John J. Allen, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 121 days.

(21) Appl. No.: 10/694,767

(22) Filed: Oct. 29, 2003

(65) Prior Publication Data

US 2004/0084957 A1 May 6, 2004

Related U.S. Application Data

(63) Continuation of application No. 10/032,477, filed on Jan. 2, 2002, now Pat. No. 6,648,422, which is a continuation of application No. 09/397,676, filed on Sep. 16, 1999, now Pat. No. 6,334,654, which is a continuation of application No. PCT/US98/23766, filed on Nov. 10, 1998, and a continuation-in-part of application No. 09/254,638, filed as application No. PCT/US97/13697 on Sep. 12, 1997, now Pat. No. 6,098,006.

(60) Provisional application No. 60/065,064, filed on Nov. 10, 1997, provisional application No. 60/026,039, filed on Sep. 13, 1996.

(51) Int. Cl.
*B60T 13/74* (2006.01)

(52) U.S. Cl. .................... 303/7; 303/3; 303/15; 303/20
(58) Field of Classification Search .................... 303/7, 303/15, 20, 3
See application file for complete search history.

(56) References Cited

U.S. PATENT DOCUMENTS

| | | | |
|---|---|---|---|
| 4,652,057 A | 3/1987 | Engle et al. | |
| 4,971,399 A | 11/1990 | Balukin et al. | |
| 5,172,316 A | 12/1992 | Root et al. | |
| 5,192,118 A | 3/1993 | Balukin et al. | |
| 5,393,129 A | 2/1995 | Troiani et al. | |
| 5,538,331 A | 7/1996 | Kettle, Jr. | |
| 5,590,042 A | 12/1996 | Allen, Jr. et al. | |
| 5,721,683 A * | 2/1998 | Joyce et al. | ................... 701/70 |
| 5,862,048 A | 1/1999 | Knight | |
| 5,984,427 A * | 11/1999 | Kettle, Jr. | ..................... 303/16 |
| 6,334,654 B1 | 1/2002 | Root et al. | |
| 6,435,624 B1 | 8/2002 | Kull et al. | |

* cited by examiner

*Primary Examiner*—Robert A. Siconolfi
(74) *Attorney, Agent, or Firm*—Barnes & Thornburg LLP

(57) ABSTRACT

An integration train brake system including a single brake controller providing locomotive and train brake commands. An electropneumatic controller is connected to the brake controller, the train brake pipe and the locomotive brake pipe A trainline controller is connected to the electrical network A locomotive computer is connected to a display A processor module connects the brake controller's commands to the trainline controller, and connects the trainline controller to the electropneumatic controller and the locomotive computer.

2 Claims, 1 Drawing Sheet

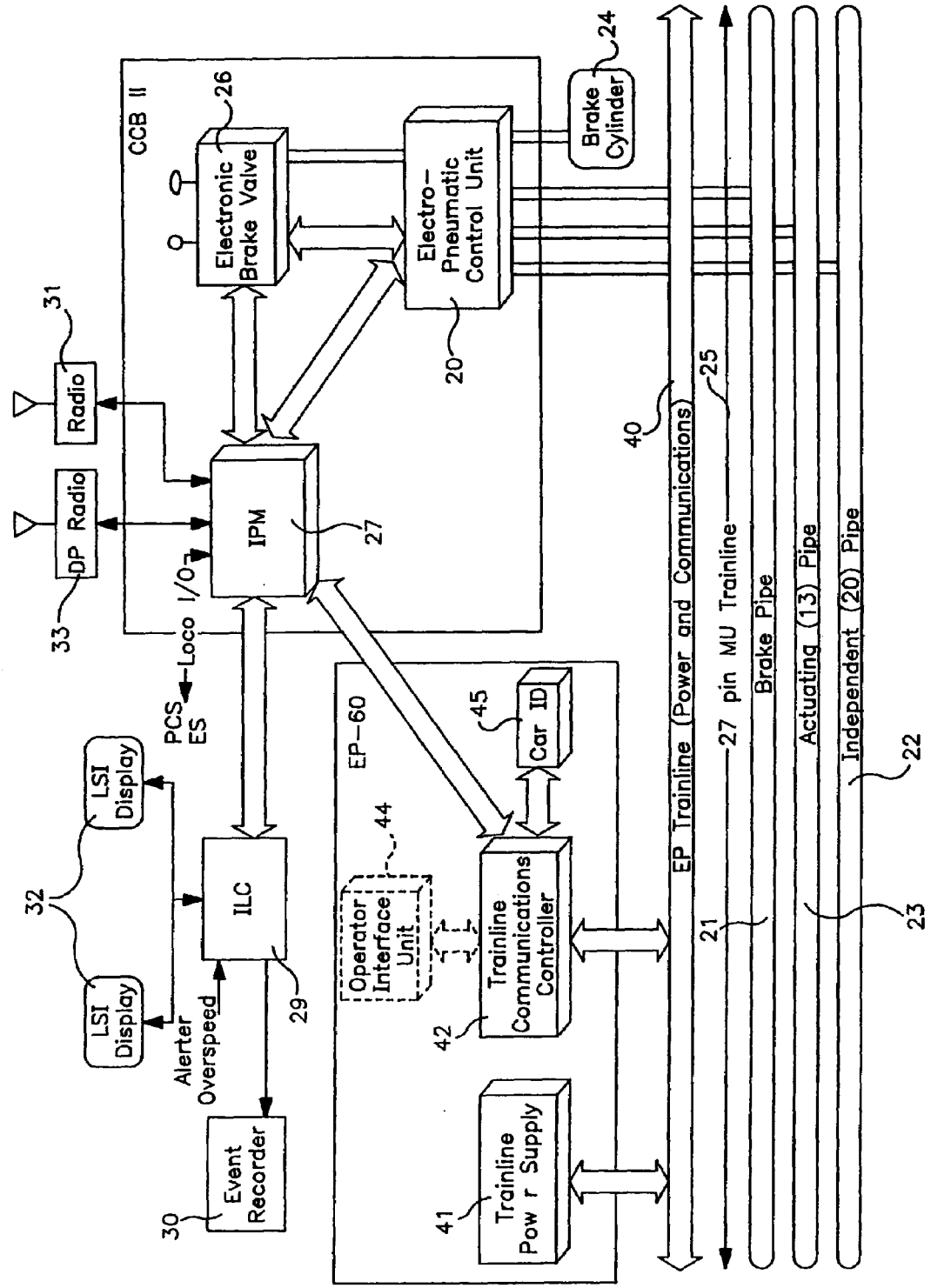

US 7,004,550 B2

INTEGRATED TRAIN ELECTRICAL AND PNEUMATIC BRAKES

CROSS-REFERENCE

This application is a continuation of U.S. Ser. No. 10/032,477 filed Jan. 2, 2002, now U.S. Pat. No. 6,648,422, which is a continuation of U.S. Ser. No. 09/397,676 filed Sep. 16, 1999, now U.S. Pat. No. 6,334,654, which is a continuation of PCT application US98/23,766 filed Nov. 10, 1998, which claims priority of U.S. Provisional Application 60/065,064 filed Nov. 10, 1997 and which is incorporated herein by reference; and also is a continuation-in-part of U.S. Ser. No. 09/254,638 filed Nov. 23, 1999, now U.S. Pat. No. 6,098,006 stemming from PCT/US97/13697 filed Sep. 12, 1997, which claims priority to U.S. Provisional Application 60/026,039 filed Sep. 13, 1996 and which is incorporated herein by reference.

BACKGROUND AND SUMMARY OF THE INVENTION

The present invention relates generally to electrically controlled pneumatic train brakes and computer controlled train brake systems, and more specifically, to the integration of the two systems.

Computer controlled brake systems are well known as exemplified by CCBI and CCBII available from New York Air Brake Corporation. These systems provide computer controls of the pneumatic control unit for the pneumatic pipes running throughout the train. This allows pneumatic controls of the locomotive as well as the individual car brakes. More recently, the industry has been striving to provide electrically controlled pneumatic brakes on each of the cars. This is led to the electrically controlled pneumatic ECP system which is independent of the computer control braking system. An overview of such a system is EP-60 available from New York Air Brake Corporation.

As presently implemented, the ECP system in the locomotive runs in parallel to that of the conventional pneumatic locomotive train controls. Two brake valves are provided, one being the brake valve for the pneumatic braking and the other being the ECP brake valve. Similarly, separate displays are provided for each system. The locomotive or the consist of the locomotives do not respond to the brake commands made by the ECP system since the locomotives respond to pneumatic single on pipes. Also, the ECP system has its own discreet input from the event recorder and from the locomotive controls to determine penalties.

With the implementation of electrically controlled pneumatic brakes, there has also been discussion of the desirability of integrating the computer controlled braking systems with the electrical controlled pneumatic brake systems.

The present system provides such integration of a brake system for a train which includes a train brake pipe extending through locomotives and cars in the train, a locomotive brake pipe extending through adjacent locomotives, pneumatic brakes on the locomotive connected to the locomotive brake pipe and electropneumatic brakes on the cars connected to the brake pipe and an electrical network. The system includes a single brake controller providing locomotive and train brake commands. An electropneumatic controller is connected to the brake controller, the train brake pipe and the locomotive brake pipe A trainline controller is connected to the electrical network A locomotive computer is connected to a display A processor module connects the brake controller's commands to the trainline controller, and connects the trainline controller to the electropneumatic controller and the locomotive computer.

Other objects, advantages and novel features of the present invention will become apparent from the following detailed description of the invention when considered in conjunction with the accompanying drawings.

BRIEF DESCRIPTION OF THE DRAWINGS

The FIGURE is a block diagram of the integration of a computer controlled brake system and a electrically controlled pneumatic brake system.

DETAILED DESCRIPTION OF THE PREFERRED EMBODIMENT

Although the present brake system will be described using EP-60 and CCBI/CCBII as an example of two systems which may be integrated, the present integrated system can be implemented using other similar pneumatic and electropneumatic systems for train and locomotive brake controls.

The computer controlled brake system in FIG. 1 includes an electropneumatic control unit 20 responsive to input signals to control the pressure on brake pipe 2, independent application and release pipe (#20) 22 and the actuating pipe (#13) 23 and the brake cylinders 24 on its locomotive. The independent application and release pipe 22 and the actuating pipe 23 run throughout the locomotive consist and allow independent control of the locomotive brakes as distinguished from the control of the pneumatic brakes in each of the car by the brake pipe 21 running throughout the train. Electrical communication and control of the locomotives in the consist is available over the 27-pin mu wire 25. This is generally under the control of the propulsion control system (not shown).

A computer controlled brake system is shown, for example as a CCBII and includes a an integrated processor module IPM 27 which electrically controls the pneumatic control unit 20. The EPM 27 receives inputs from an electronic brake valve 26 having an automatic brake handle to control the brake pipe 21 and an independent brake handle to control the locomotive brakes via independent pipe 22 and actuating pipe 23. An integrated locomotive computer ILC 29 connects the IPM to an event recorder 30 and displays 32. Penalties, for example Aleter and Overspeed are inputs to the ILC 29. The IPM 27 is connected to locomotive systems, not shown, and exchanges a power cut-off switch signal PCS and emergency sand signal ES. The IPM 27 may be integrated with distributed power and would communicate via radio module 33 to the other locomotives in the consist and well as distributed throughout the train. An end of train radio 31 communicates to the end of train device.

The connection between the IPM 27, the brake valve 26 and the electropneumatic control unit 20 is by a common bus. The suggested connection, which is an AAR standard, is a LonWork Network wherein each of the modules are a node on the nueral network. The connection between the IPM 27 and the ILC 29 is a standard computer bus for example, an RS422-HDLC. The system is described so far is well known and need not be described in further detail.

The controls of an electrically controlled pneumatic brake system ECP of the prior art is illustrated as EP 60 available from New York Air Brake Corporation. The electric controlled pneumatic brakes includes a train power supply TPS 41, which connects the locomotive batteries to an EP train line 40. This is an electric line that runs throughout the train and provides power and communications to EP 60 brakes on each car and if available on locomotives. A trainline communication controller TCC 42 is connected to the EP trainline 40 as a node on the neural network. An operator interface unit 44 is shown in phantom connected to the TCC 42 and may be deleted. A car ID node is shown as node on the network and is part of the EP-60 system. In the prior art, the TCC 42 has no control over the pneumatic brake lines 21, 22 and 23. It only controls communication, either providing or receiving information, via the EP trainline 40. Thus, it can only communicate with other locomotives in the train which have TCC trainline controllers 42 or EP nodes on the network and connected to the EP trainline 40.

Although the EP trainline is shown as a line running through each car in the train, it is to be understood that the EP neural network may be by radio or other non-wire connection.

As implemented in the prior art, the EP brake system runs in parallel to that of the conventional pneumatic or computer control locomotive train controls. The two brake valves are provided, one the pneumatic brake valve and the other being the EP brake valve. Similarly, separate displays are provided. The locomotive or the consist of the locomotives do not respond to the brake commands made by the EP locomotive system. Also, the EP system has its own discreet input from the event recorder 30 and locomotive controls to determine penalties.

The integrating of the computer controlled braking systems with the electrical controlled pneumatic brake systems is achieved by interconnecting these systems as nodes on a common network as shown. The integration results in having only a single brake control valve, namely the CCB control valve 26, and eliminating the EPC control valve. Also, separate access to the event recorder 30, end of train device and a display for the TCC 42 is not required and is available from the computer control brake portion. Access to the penalties and other locomotive controls for the TCC 42 is also through the computer control brake system. Finally, the ability of the locomotive brakes to be under the electronic controlled pneumatic system TCC 42 is provided.

The train control signals from the brake valve 26 is provided to the IPM 27 and, depending upon whether IPM 27 is in the pneumatic or the electronic mode, either controls the pneumatic control unit 20 for control of brake pipe 21, or provides the brake command signals to the TCC 42 which provides electrical train or car brake signals over the EP trainline 40. The IPM 27 will not reduce the equalization reservoir (not shown) in response to the brake valve automatic handle movements in the EP mode as it would in the pneumatic mode. This keeps the brake pipe 21 fully charged.

All locomotives equipped with EP will respond to the control signal in the EP trainline 40 to apply its brakes in response to an EP application. Simultaneously, the lead ECP equipped locomotive will apply the proportional pneumatic brake signal on the independent brake application and release pipe 22. The signal on this pipe will be monitored by the trailing locomotive units that do not have EP capability and will apply the locomotive brakes accordingly.

A switch will be provided to indicate to the IPM controller 27 whether it should be operating in the pneumatic or the electric control mode.

The IPM 27 in combination with electronic brake valve 26 forms a brake controller which provides locomotive and train brake commands. TCC 42 forms a first control connected to the brake controller 27,26 and transmits a car brake signal on the network or EP trainline 40 for train brake commands. A second control, which includes control unit 20, is also connected to the brake controller 27,26 and transmits a locomotive brake signal on the locomotive brake pipe, which is independent pipe 22, for train and locomotive brake commands. The applying and release of the locomotive brakes using the independent pipe 22 can be achieved as well as bail-off without using the actuating pipe 23. Thus, the actuating pipe 23 may be deleted.

As previously discussed, the brake controller 27,26 has a pneumatic mode and an electrical mode. The default mode for power up and certain types of failure is the pneumatic mode. In the electrical mode, the brake controller 27,26 provides trainline brake signals on trainline 40 for the cars and locomotives that have EP brakes and are connected to the trainline 40. In the pneumatic mode, the brake controller 27,26 provides the train or car brake signals on the brake pipe 21. For both the electronic and pneumatic mode, the control 20 provides locomotive braking signals on the locomotive brake pipe or independent brake pipe 22.

The controller 27,26 can determine a system initiated emergency brake command or an operator initiated emergency brake command. The operator initiated brake commands will come from the brake valve 26 wherein the system initiated brake commands may come through the ELC 29 or off the train brake pipe 21. The controller 27,26 provides signals to the TCC 42 which transmits an emergency brake signal on the network for system and operator initiated emergency brake commands. The controller 27,26 provides commands to the control unit 20 which transmits an emergency brake signal on the train and locomotive brake pipes 21,22 for operator initiated brake commands. Thus, for system emergency brake commands, only the EP brake is applied, while for operator brake commands, the EP and the pneumatic brake systems are operated. The train brake signals and the locomotive brake signals are transmitted as a percentage of brake signals.

The controller 27,26 provides penalty brake commands. For these penalty brake commands, it provides penalty brake command signals to the control TCC42 to transmit a car brake signal on the network for penalty brake commands. As with other car brake signals on the network, the brake pipe 21 is maintained charged. Controller 27 also determines whether suppression brake command has occurred to either remove or prevent the application of a penalty brake. This is the suppressing position of the automatic brake handle of the electric brake valve 26. If the suppression brake commands occur during a penalty brake command, the controller 27,26 does not send control or brake command signals to the control 42 or removes and interrupts any penalty application which control 42 provides on the EP trainline 40. As is well known, the controller 27,26 provides a power cutoff signal to the locomotive propulsion system for penalty brake commands.

In prior systems, moving the automatic brake handle to the suppression position causes a brake pipe reduction which applies the train brakes. This is undesirable and avoided by the present system, which uses the suppression position only as an electric control signal and does not produce pneumatic results in the brake pipe 21.

As can be seen, in an ECP train, the brake pipe is primarily an air supply and is not used for brake controls. In the present system, the brake pipe 21 is used as a back up to allow pneumatic operation of the train brakes as well as for operator initiated emergencies. With future acceptance by the industry of ECP brakes, the train brake pipe 21 and the locomotive pipes 22 and 23 may have no control functions. In an all EP train, the independent locomotive brake pipe 22 and the actuating locomotive pipe 23 will be eliminated. All signals will be sent out over the EP trainline 40. Thus, trainline braking signals will be addressed separately to cars and locomotives, and special locomotive braking signals will be addressed only to locomotives.

It should also be noted in the present system, even that includes the independent brake pipe 22 with or without the actuating pipe 23, that those locomotives which have EP brakes preferably will receive their brake signal over the electric trainline 40. Those locomotives that do not have EP brakes will receive the signals pneumatically over the independent or locomotive brake pipe 22. Those locomotives which are not adjacent to the lead locomotive and not connected to other locomotives by the independent brake pipe 22 will either receive their signals by radio 33 or the remote locomotive may have EP capability and receive its signals on EP trainline 40. It may then control other adjacent locomotives on its consist pneumatically if they are connected by an independent pipe 22. Another example of a remote locomotive would be a helper locomotive which is attached at the end of the train when needed to ascend a certain grade. These locomotives would be EP equipped and would take their locomotive brake signals off the EP trainline 40. These would include automatic, independent and bailoff commands.

The brake controller 27 will power up in a conventional or pneumatic mode. In order to be switched over to the electrical mode, it must be selected as a lead locomotive and then switched over to the electric mode.

By integrating or coordinating the electrically controlled pneumatics or the ECP system through the computer control brake system, allows enhancement of safety. The computer controlled brake system can determine whether the electrical controlled pneumatics 42 are operating and if not, provide pneumatic control of the brake pipe 21 to ensure braking throughout the train. Also, by providing a single brake control valve 26 and a single display 32, the operator need not make a decision in an emergency on whether to switch from electrical controls to pneumatic controls. The operator uses a single handle and a single display and selects whether to use pneumatic or electrical controls and if the electrical controlled brakes are not operative, the system will automatically switch to pneumatic control without any other input from the operator. Thus, not only does the integration increase reliability of the two systems, but also substantially removes operator error.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A brake system of a train which includes a train brake pipe extending through locomotives and cars in the train, a locomotive brake pipe extending through adjacent locomotives, pneumatic brakes on the locomotives connected to the locomotive brake pipe, and electropneumatic brakes on the cars connected to the train brake pipe and an electrical network, the system further comprising:

a brake controller providing locomotive and train brake commands;

an electropneumatic controller connected to the brake controller, the train brake pipe and the locomotive brake pipe;

a trainline controller connected to the electrical network;

a locomotive computer connected to a display; and a processor module portion of the brake controller connecting the brake controller's commands to the trainline controller, and connecting the trainline controller to the electropneumatic controller and the locomotive computer.

2. The brake system according to claim 1, including a distributed power system connected to the processor module and the processor communicating on the distributed power system.

* * * * *